(12) United States Patent
Gilliland et al.

(10) Patent No.: US 6,485,189 B1
(45) Date of Patent: Nov. 26, 2002

(54) HIGH DENSITY MULTIPLE FIBER OPTIC CONNECTOR

(75) Inventors: Patrick B. Gilliland, Chicago, IL (US);
Carlos Jines, Forest Park, IL (US);
Anastasia Bardouniotis, Chicago, IL (US)

(73) Assignee: Stratos Lightwave, Inc., Chicago, IL (US)

( * ) Notice: Subject to any disclaimer, the term of this patent is extended or adjusted under 35 U.S.C. 154(b) by 0 days.

(21) Appl. No.: 09/852,163

(22) Filed: May 9, 2001

(51) Int. Cl.$^7$ .............................. G02B 6/38; G02B 6/42
(52) U.S. Cl. ............................ 385/59; 385/60; 385/89; 385/92; 385/62
(58) Field of Search .................. 385/58–60, 62, 385/70–72, 81, 88–89, 92, 139, 66

(56) References Cited

U.S. PATENT DOCUMENTS

| | | | |
|---|---|---|---|
| 4,697,871 A | 10/1987 | Cook | 350/96.21 |
| 4,759,599 A | 7/1988 | Yamaguchi et al. | 350/96.21 |
| 4,934,785 A | 6/1990 | Mathis et al. | 350/96.21 |
| 5,065,988 A * | 11/1991 | Wedell | 267/149 |
| 5,259,779 A | 11/1993 | Ooya et al. | 439/247 |
| 5,326,279 A | 7/1994 | Sumida | 439/540 |
| 5,328,381 A | 7/1994 | Seymour et al. | 439/247 |
| 5,373,574 A | 12/1994 | Marazzi | 385/78 |
| 5,436,993 A * | 7/1995 | Antonini et al. | 385/59 |
| 5,481,634 A | 1/1996 | Anderson et al. | 385/76 |
| 5,584,721 A | 12/1996 | Taniuchi et al. | 439/374 |
| 5,732,175 A * | 3/1998 | Fan | 385/66 |
| 5,774,611 A * | 6/1998 | Nagase et al. | 385/58 |
| 5,971,625 A * | 10/1999 | Lu | 385/55 |
| 6,076,974 A | 6/2000 | Carlisle et al. | 385/76 |
| 6,102,581 A | 8/2000 | Deveau et al. | 385/56 |
| 6,116,788 A * | 9/2000 | Melchior et al. | 385/59 |
| 6,146,023 A * | 11/2000 | Weigel | 385/139 |
| 6,264,374 B1 * | 7/2001 | Selfridge et al. | 385/60 |

OTHER PUBLICATIONS

Trewhella, et al., Performance Comparison of Small Factor Fiber Optic Connectors, downloaded off of the LC Alliance web site on Aug., 2000.

Struhar, John, Jr., Selecting a Small–Form–Factor Fiber Optic Connector for Private Networks, Fiber Optic Technical Bulletin 21, Lucent Technologies, 1998, downloaded off of the LC Alliance web site on Aug., 2000.

SFF Optical Transceiver LC vs. MT–RJ Geometric Comparison, Methode Electronics, Inc., downloaded off of the LC Alliance web site on Aug., 2000.

Peppler, et al., Evaluating the LC SFF Interface for Single–Mode and Multimode Applications, downloaded off of the LC Alliance web site on Aug., 2000.

LC Dimensions, downloaded off of the LC Alliance web site on Aug., 2000.

LC Illuminating answers to frequent questions, downloaded off of the LC Alliance web site on Aug., 2000.

LC See the advantages of the LC interface, downloaded off of the LC Alliance web site on Aug., 2000.

LC Alliance homepage, downloaded off of the LC Alliance web site on Aug., 2000.

* cited by examiner

Primary Examiner—Robert H. Kim
Assistant Examiner—Krystyna Suchecki
(74) Attorney, Agent, or Firm—Karl D. Kovach (57) ABSTRACT

A fiber optic plug for connecting to a receptacle of a small format optoelectronic package or device. The fiber optic plug includes a body and ferrules attached to the body. Each ferrule has an aperture for receiving and holding an optical fiber and each ferrule has a diameter substantially equal to 1.25 mm. The aperture of each adjacent ferrule is separated by a distance of approximately 3.125 mm. The ferrules exist in a plane.

1 Claim, 13 Drawing Sheets

HIGH DENSITY MULTIPLE FIBER OPTIC CONNECTOR

BACKGROUND OF THE INVENTION

1. Field of the Invention

The present invention pertains to fiber optic connectors for optoelectronic devices or optical subassemblies. The invention more particularly concerns a fiber optic plug for connecting to a receptacle of a small format optoelectronic package such as a modular high density multiple optical transmitter/receiver array.

2. Discussion of the Background

Optoelectronic devices such as optical transceivers are known in the art and include active optical devices or diode packages. One such optoelectronic device is a removable optoelectronic module as described in U.S. Pat. No. 5,546,281, which is hereby incorporated herein by reference. One end of the removable optoelectronic module includes two SC style ports or receptacles forming an SC duplex receptacle for receiving SC style ferrules. Often, the two SC style ferrules are either ganged together or are assembled in a common plug body so as to form an SC duplex plug. The ferrule of an SC plug has a nominal diameter of approximately 2.5 mm. When the ferrules are incorporated into a single body or are ganged together, the center-to-center distance between the two ferrules is approximately 12.5 mm. As compared to conventional copper plugs, such as RJ-45 style plugs, the size or panel profile of the SC duplex plug is large.

In order to increase the number of ports which can occupy a panel, a reduced size ferrule and plug were developed and is disclosed in U.S. Pat. Nos. 5,481,634 and 6,102,581, both of which are hereby incorporated herein by reference and where such a plug is known as an LC plug connector. The ferrule of the LC plug has a nominal diameter of approximately 1.25 mm. When two LC ferrules are ganged together or are incorporated into a single body the center-to-center distance of the two ferrules is approximately 6.25 mm. Thus, the number of ports located in a given linear dimension using an LC duplex plug is equivalent to the number of copper ports located in the same linear dimension using the RJ-45 plug, since the size of the profiles of the two plugs are similar.

Figure 1:
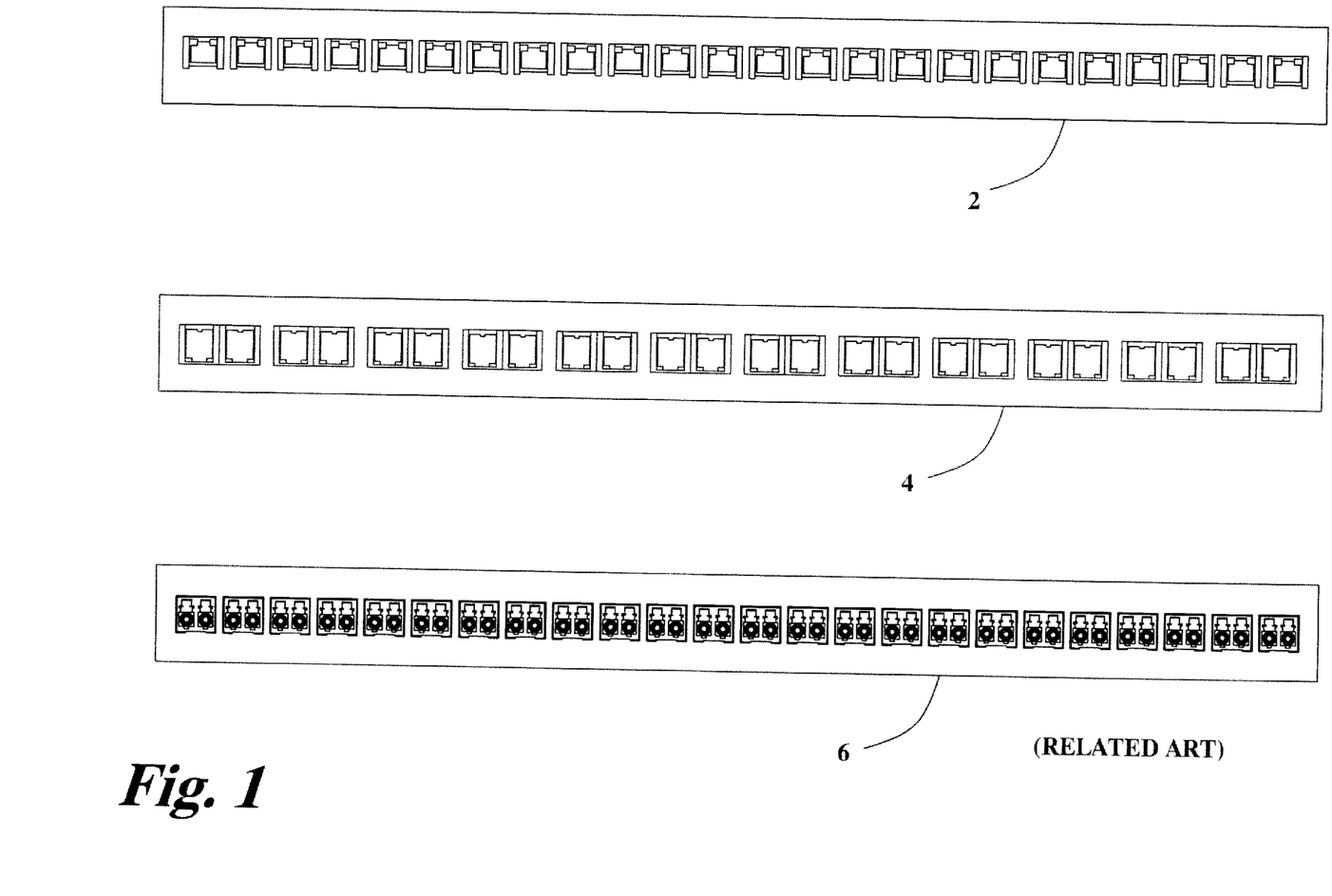
FIG. 1 is a plan view of the RJ-45, SC, and LC ports.

FIG. 1 shows a plan view of a panel showing the relative size of RJ-45 ports 2, SC ports 4, and LC ports 6. Twenty-four RJ-45 and LC ports 2, 6 are shown and only twelve SC ports 4 are shown occupying similar linear lengths. The increased port density allows more data to be moved through a given port profile of networking equipment. FIG. 1 is found in a document entitled "Evaluating the LC SFF Interface for Single-Mode and Multimode Application" and is available on the internet web-page at the home of the LC Alliance (www.lcalliance.com). The above-identified document is hereby incorporated herein by reference.

Other plug connectors have spacing between optical fibers which are nominally spaced center-to-center at approximately 0.75 mm. One such plug connector is known as the MT-RJ and is described in an article entitled "Performance Comparison of Small Form Factor Fiber Optic Connector" which is available on the internet web page of the LC alliance, and where the document is hereby incorporated herein by reference. The MT-RJ plug connector includes a body or single ferrule, where the body surrounds and holds two optical fibers. However, such plug connectors do not employ multiple ferrules and as a result the coupling of light into and out of a fiber in an MT-RJ or other multi-fiber single ferrule connector can not be independently optimized for each fiber. Therefore, optical plug connectors which do not incorporate a single ferrule for a single optical fiber introduce new problems, and, as such, optical plug connectors which do not incorporate a single ferrule in conjunction with a single optical fiber are not further considered.

Therefore, there is a need in the industry for an optical plug having multiple ferrules where a single ferrule is assigned to a single optical fiber and which increases the port density in a panel or device.

SUMMARY OF THE INVENTION

Therefore, it is an object of the present invention to provide an optical plug connector which increases the port density in a panel or device.

It is still another object of the invention to provide a plug which mates with a receptacle of a small format optoelectronic device.

Another object of the invention is to provide a plug which is economical to manufacture.

Yet another object of the invention is to provide a plug which incorporates standard parts and features.

In one form of the invention, the plug includes a body and ferrules attached to the body. Each ferrule has an aperture. Additionally, all of the ferrules exist in a plane and each ferrule has a diameter substantially equal to 1.25 mm. The aperture of each of the ferrules is separated from the aperture of an adjacent ferrule by a distance of 3.125 mm.

In another form of the invention, the plug includes a body and two ferrules attached to the body. Each ferrule has an aperture. The aperture of one ferrule is separated from the aperture of the second ferrule by a distance of 3.125 mm.

Thus, the device of the invention is superior to existing plugs. The plug of the invention increases port density in a panel or a device. Furthermore, the plug of the invention is easy to manufacture and incorporates features of commercially well received connectors. Thus, the device of the invention is smaller than prior art devices.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Referring now to the drawings, wherein like reference numerals designate identical or corresponding parts throughout the several views, and more particularly to FIGS. 2–5 and 8–23 thereof, is an optical plug 10, 30, 60, 80, 100, 120.

Figure 2:
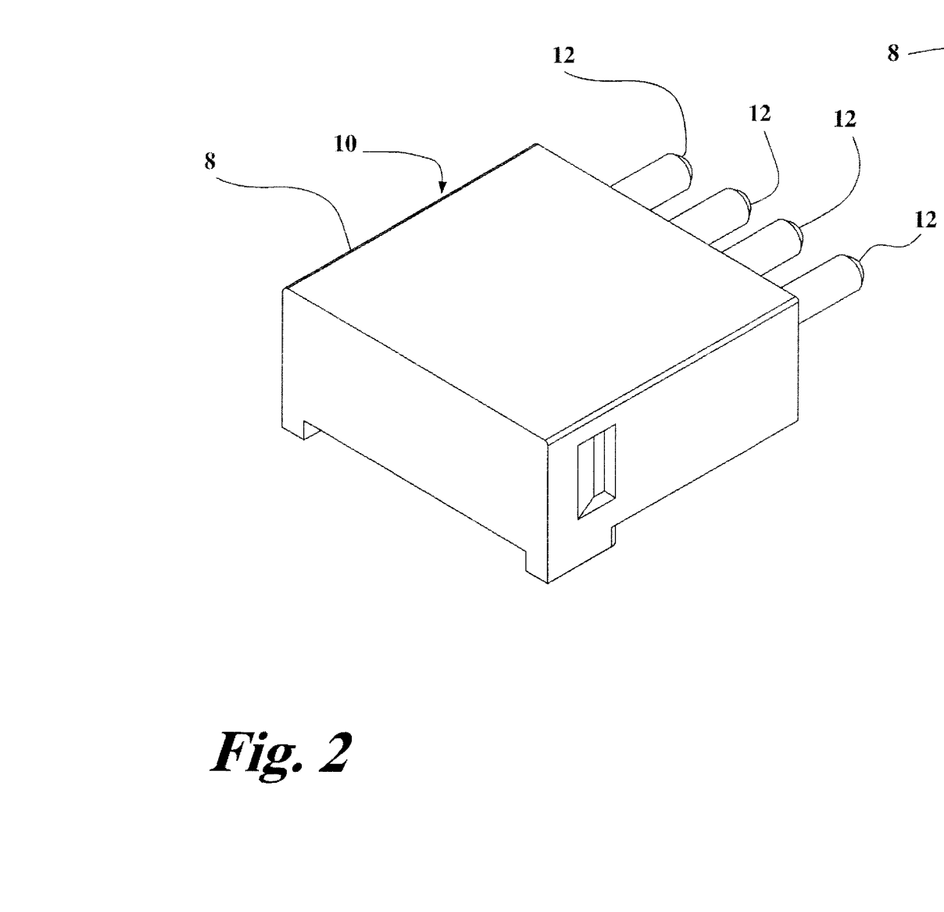
FIG. 2 is a perspective view of a plug of the present invention.
Figure 3:
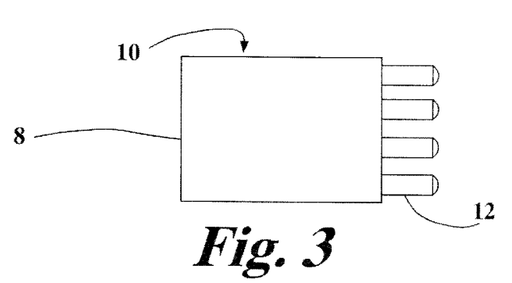
FIG. 3 is a top view of the plug of FIG. 2.
Figure 4:
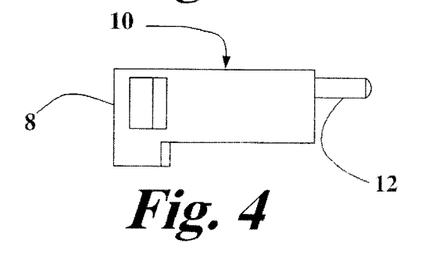
FIG. 4 is a side view of the plug of FIG. 2.
Figure 5:
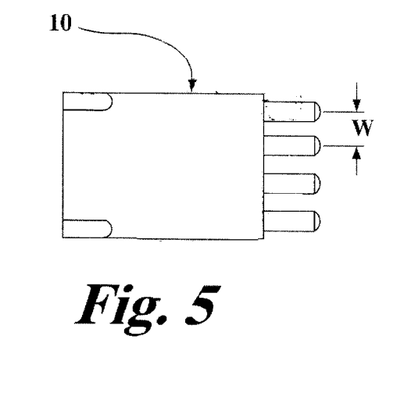
FIG. 5 is a bottom view of the plug of FIG. 2.

FIG. 2 is a perspective view of the plug 10 which shows four ferrules 12 held by a body 8. The body 8 is made of a polymer material and is typically formed by an injection molding process. The ferrules 12 are preferably made of a glass, a ceramic material, or a polymer material. Each ferrule 12 has a portion which conforms to the LC standard and, as such, has a nominal diameter of 1.25 mm and an aperture extending along the length of the ferrule 12 so as to receive an optical fiber. FIG. 3 is a top view of the plug 10. FIG. 4 is a side view of the plug 10 showing the ferrules 12, where the ferrules 12 are positioned substantially in a single plane. FIG. 5 is a bottom view of the plug 10 which shows the center-to-center spacing, W, between ferrule apertures, where the center-to-center spacing, W, is substantially equal to 3.125 mm.

Figure 6:
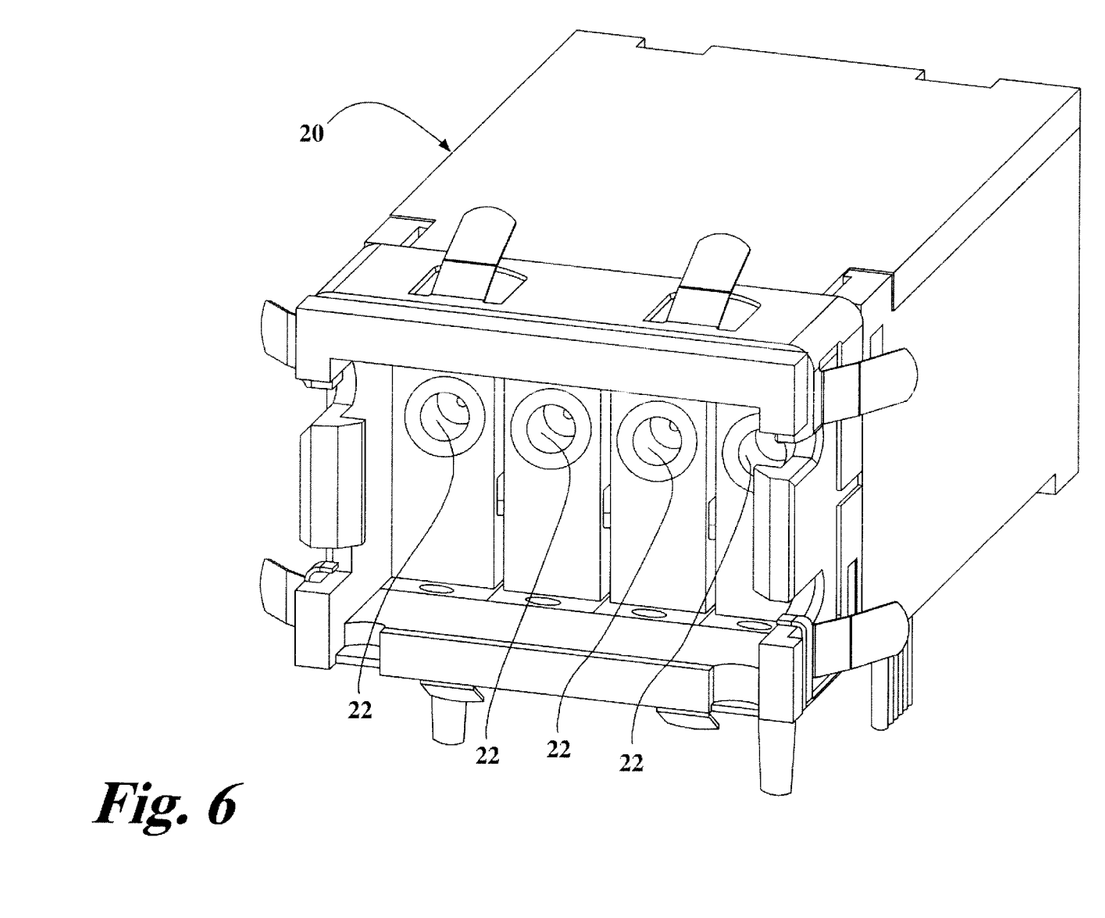
FIG. 6 is a perspective view of a modular high density multiple optical transmitter/receiver array which may receive a plug of the present invention.
Figure 7:
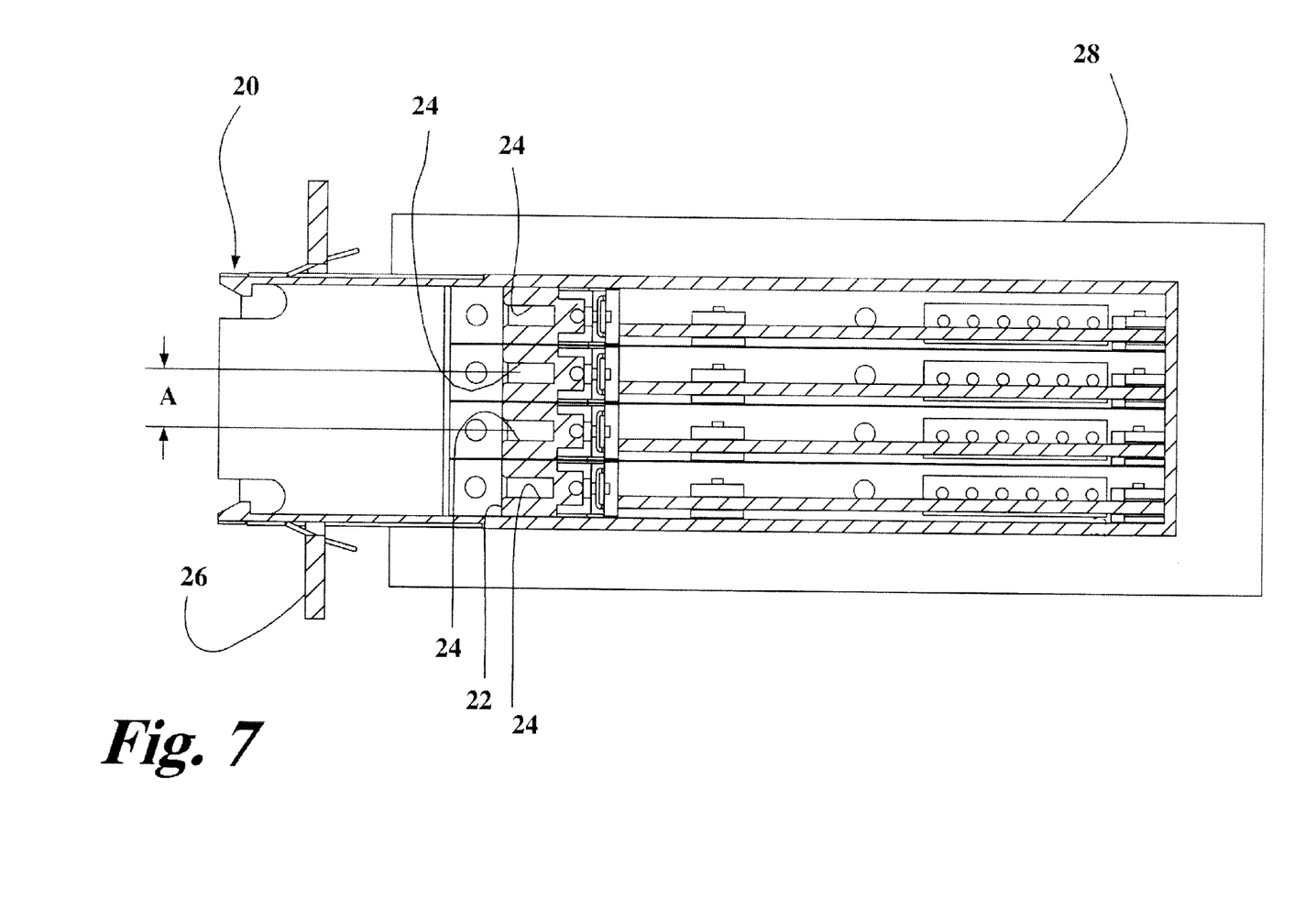
FIG. 7 is a cross-sectional plan view of the modular high density multiple optical transmitter/receiver array of FIG. 6 attached to a printed circuit board.

FIG. 6 is a perspective view of a modular high density multiple optical transmitter/receiver array 20. The plug 10 is adapted to engage ports 22 of the modular high density multiple optical transmitter/receiver array 20. FIG. 7 is a cross-sectional view of the modular high density multiple optical transmitter/receiver array 20 of FIG. 6 showing ferrule receiving bores 24 of the ports 22. The modular high density multiple optical transmitter/receiver array 20 is shown connected to a printed circuit board 28 and to a panel 26. FIG. 7 further shows that, nominally, the centers of adjacent ferrule receiving bores 24 are separated by a distance, A, which is substantially equal to 3.125 mm. Each port 22 is a modular unit which is individually assembled into the array and can be either a transmitter or a receiver.

Figure 8:
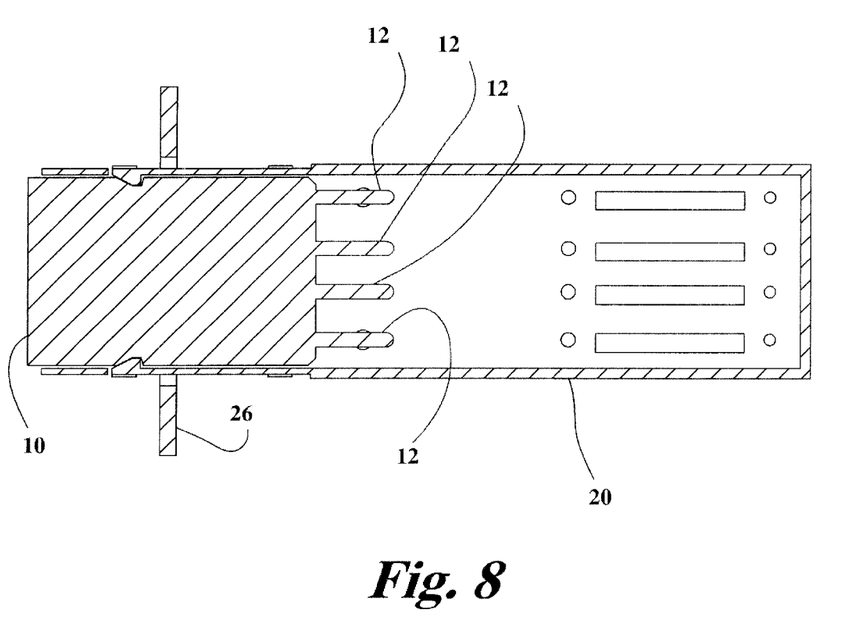
FIG. 8 is a partial cross-sectional plan view of the modular high density multiple optical transmitter/receiver array of FIG. 6 and the plug of FIG. 2 mated therein.

FIG. 8 is a partial cross-sectional view of the plug 10 engaged with the modular high density multiple optical transmitter/receiver array 20. Ferrules 12 of the plug 10 are also displayed. However, for reasons of clarity, the ports 22 are not shown and the internal components of the plug 10 are not shown. Furthermore, the array 20 is shown in relation to the panel 26.

Figure 9:
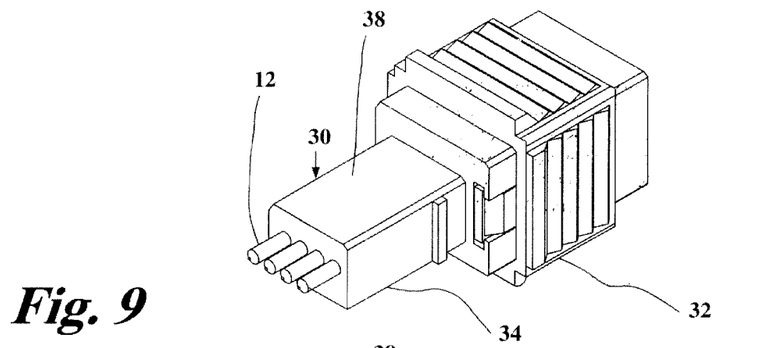
FIG. 9 is a perspective view of another embodiment of the plug.

FIG. 9 is another plug 30 embodiment of plug 10. Plug 30 has four ferrules 12 similarly spaced apart as in the embodiment of plug 10. The plug 30 includes a sleeve 32 which slides or translates relative to the body 34. A cover or shroud 38 covers a cavity formed within the body 34. When translating the sleeve 32, the sleeve 32 either engages or disengages the plug 30 from the array 20. The sleeve 32 operates in a manner consistent with known MP style optical connectors manufactured by Stratos Lightwave, Inc, and is disclosed in U.S. Pat. Nos. 6,045,270; 5,896,479; 5,748,818; and 5,737,463, all of which are hereby incorporated herein by reference.

Figure 10:
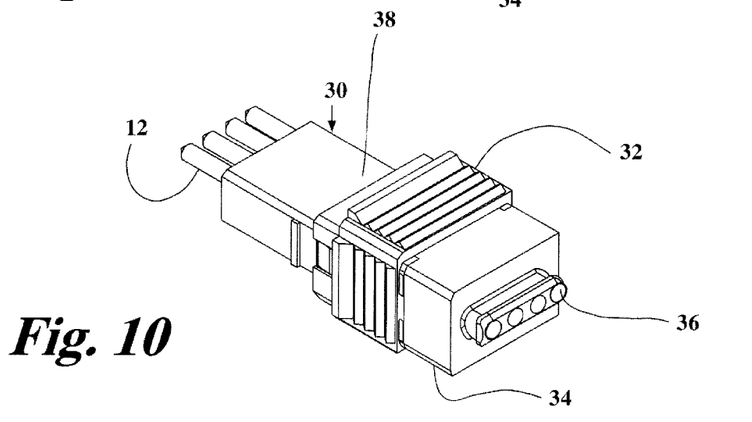
FIG. 10 is a perspective view of the plug of FIG. 9 taken from another angle.
Figure 11:
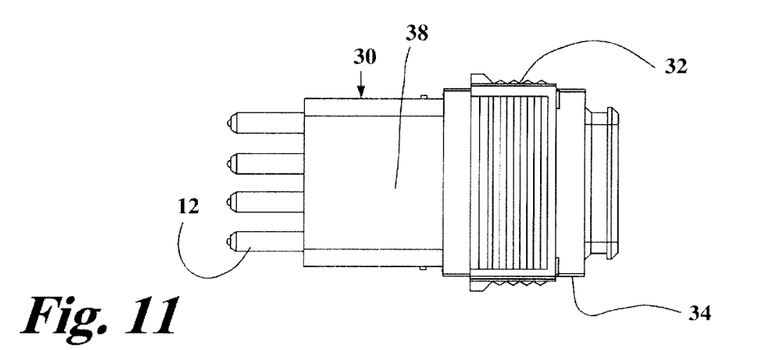
FIG. 11 is a top view of the plug of FIG. 9.

FIG. 10 is another perspective view of the plug 30. FIG. 10 further shows that the body 34 includes optical fiber receiving apertures 36 for receiving and guiding optical fibers (not shown). FIG. 11 is a top view of the plug 30.

In practice, an operator pushes on the body 34 to engage the plug 30 with an optoelectronic device 20. To disengage the plug 30 from the optoelectronic device 20, the operator pushes the sleeve 32 toward the optoelectronic device 20 until the plug 30 is unlocked or released. At that time, the plug 30 can be withdrawn from the optoelectronic device 20.

Other sleeve arrangements can be employed other than the MP style sleeve 32, such an example includes a LIGHTRAY MPX style sleeve ( not shown), where LIGHTRAY MPX is a trademark of the Whitaker Corporation. The LIGHTRAY MPX style sleeve allows the operator to push on the sleeve to engage the plug with the optoelectronic device and to pull on the sleeve to disengage the plug from the optoelectronic device.

Figure 12:
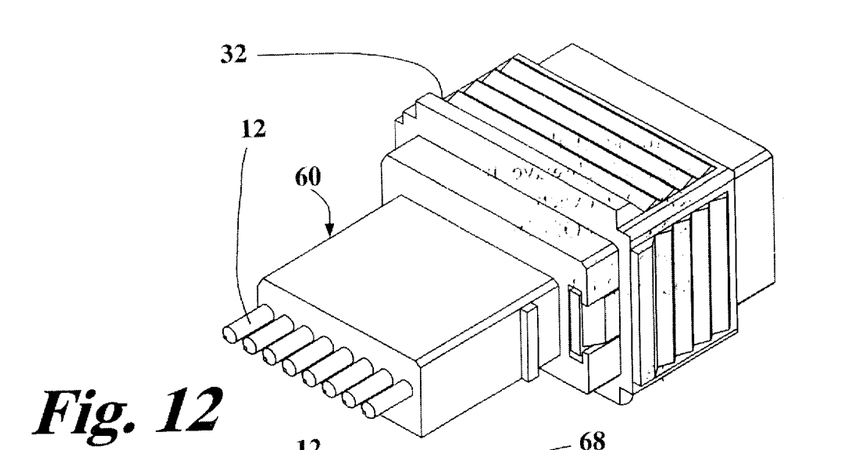
FIG. 12 is a perspective view of an embodiment of a plug having eight ferrules.
Figure 13:
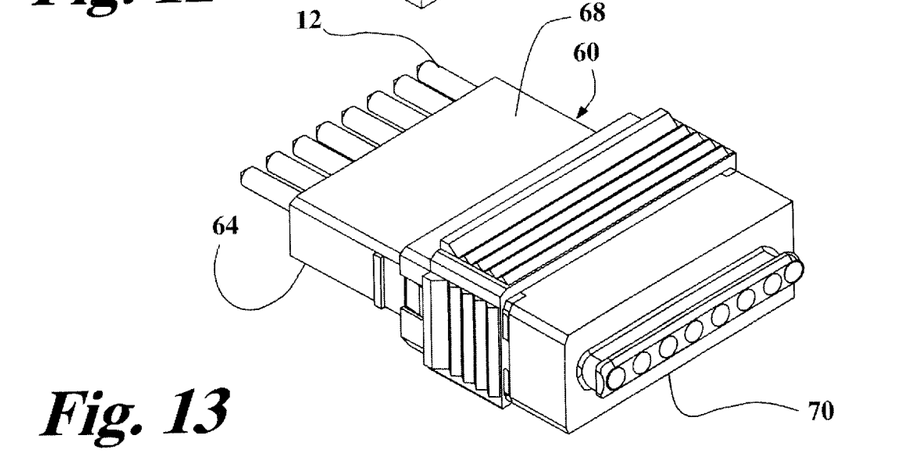
FIG. 13 is a perspective view of the plug of FIG. 12 taken from another angle.
Figure 14:
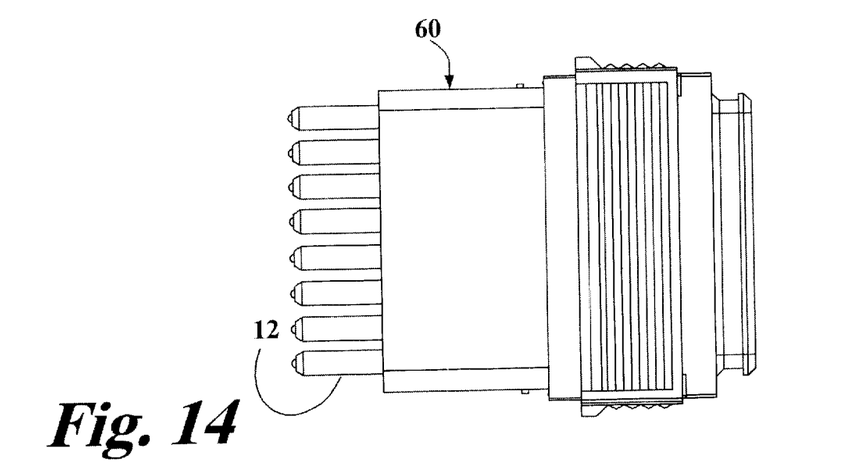
FIG. 14 is a top view of the plug of FIG. 12.

FIGS. 12–14 disclose another embodiment of the invention which is a plug 60 having eight ferrules 12. The plug 60 includes a sleeve 62 around a body 64 and a cover or shroud 68. The body 64 includes a base 70. Assembly and function of the plug 60 is similar to the plug 30.

Figure 15:
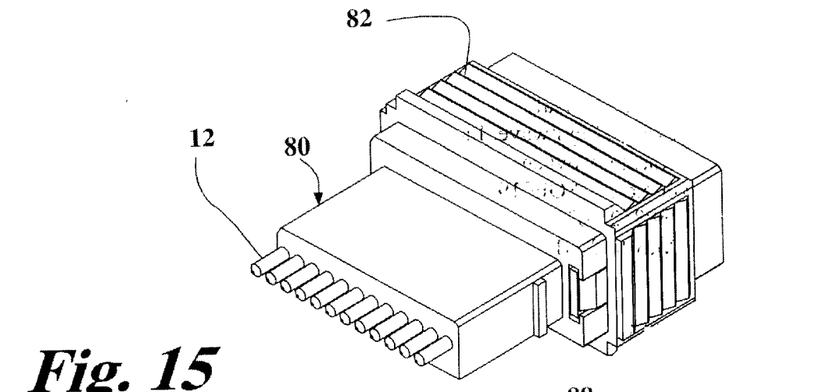
FIG. 15 is a perspective view of an embodiment of a plug having twelve ferrules.
Figure 16:
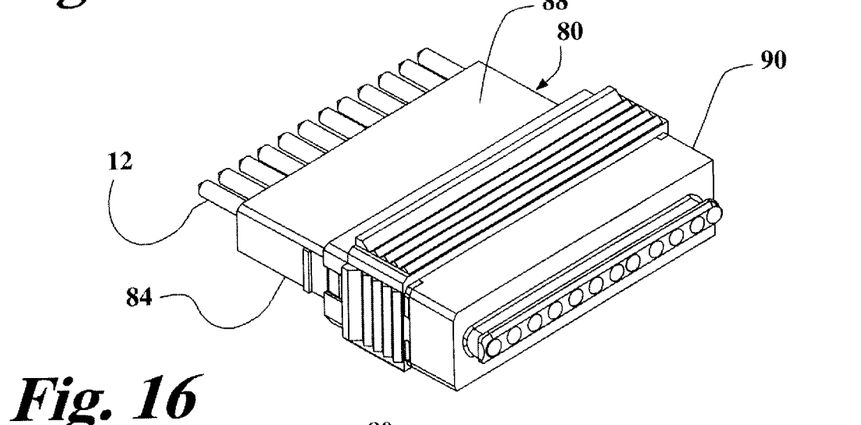
FIG. 16 is a perspective view of the plug of FIG. 15.
Figure 17:
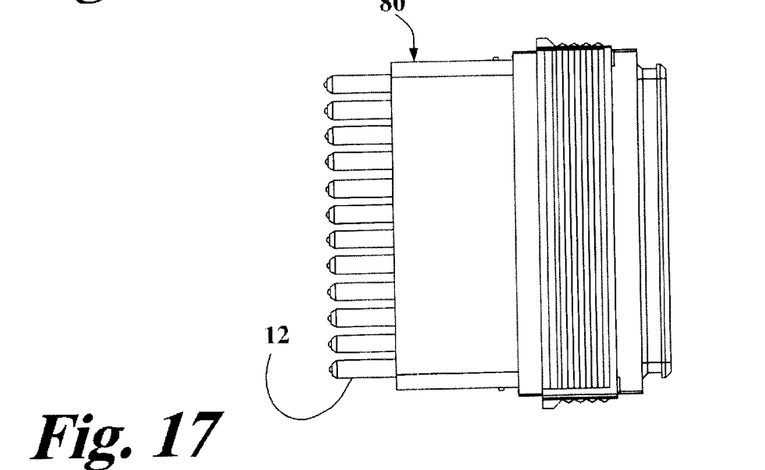
FIG. 17 is a top view of the plug of FIG. 15.

FIGS. 15–17 disclose another embodiment of the invention which is a plug 80 having twelve ferrules 12. The plug 80 includes a sleeve 82 around a body 84 and a cover or shroud 88. The body 84 includes a base 90. Assembly and function of the plug 80 is similar to the plug 30.

Figure 18:
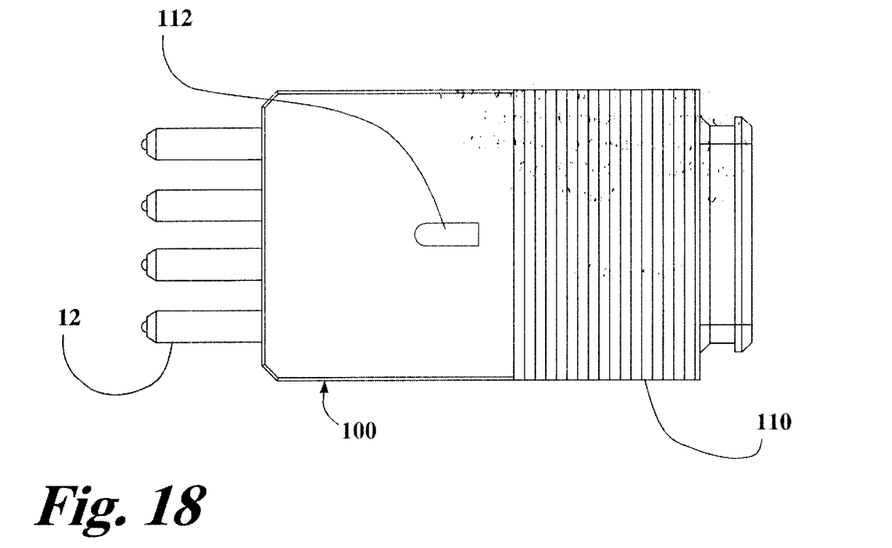
FIG. 18 is a top view of another embodiment of the four ferrule plug having an SC style outer sleeve.
Figure 19:
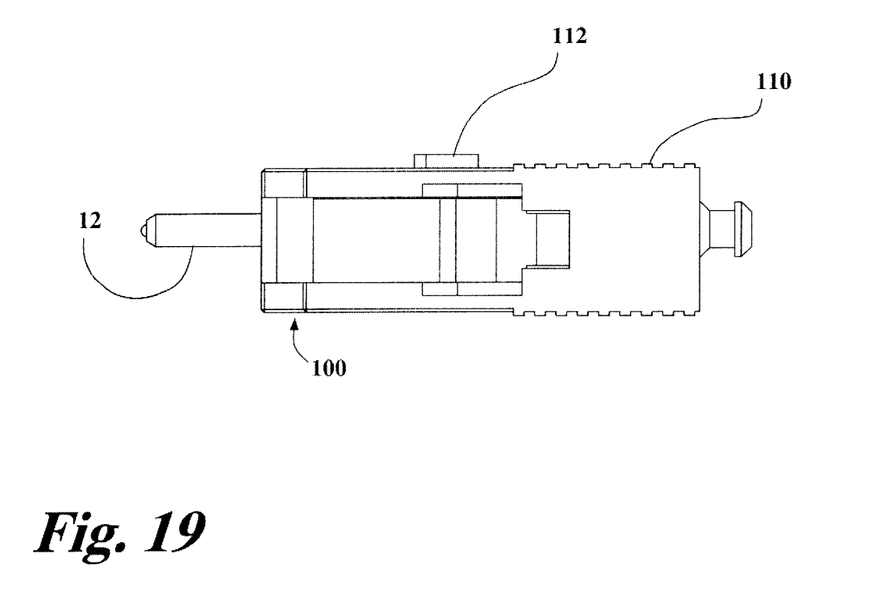
FIG. 19 is side view of the plug of FIG. 18.
Figure 20:
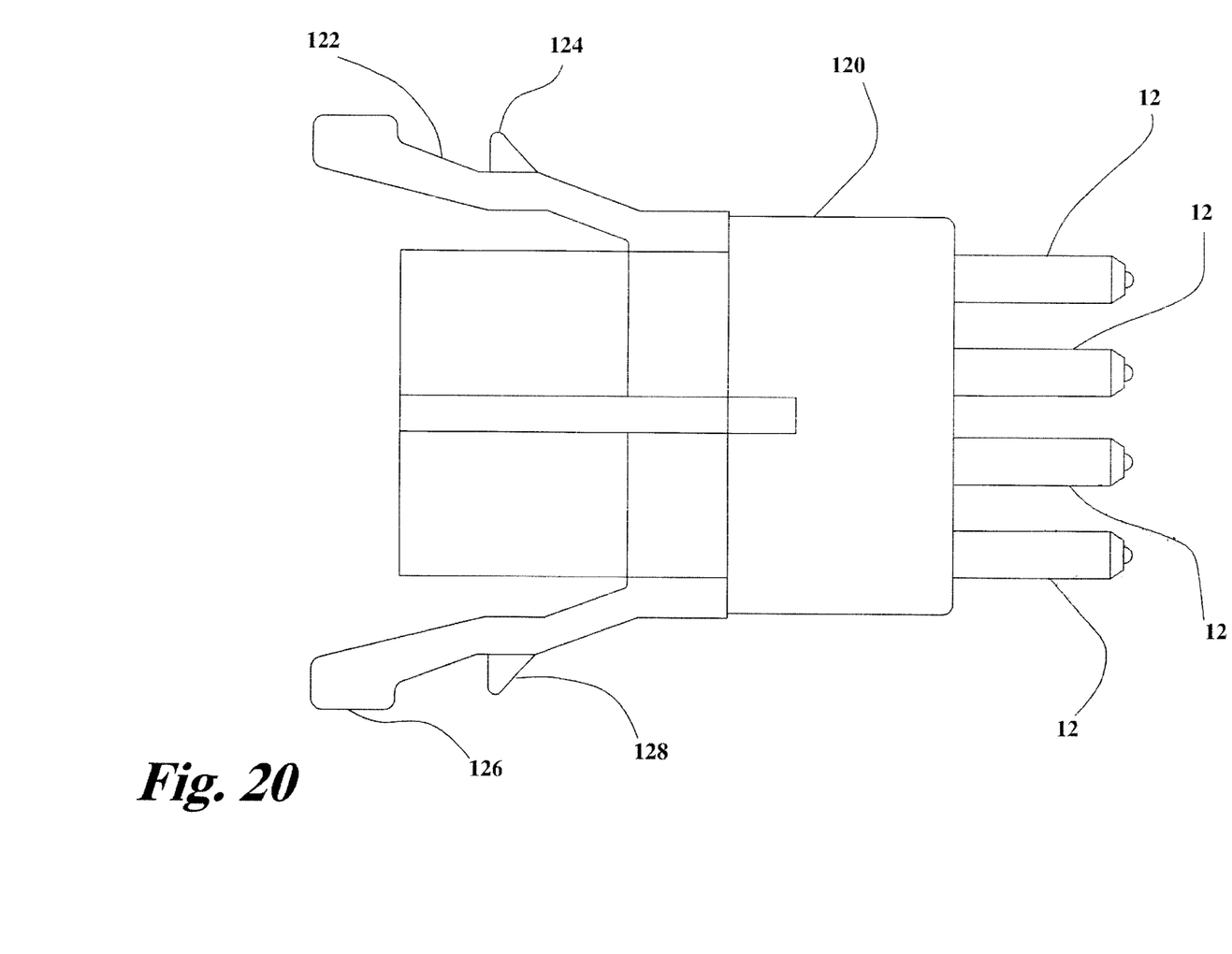
FIG. 20 is a top view of another embodiment of the four ferrule connector or plug having flexible latch arms.

FIGS. 18 and 19 disclose another embodiment of the invention which is a plug 100 having four ferrules 12 where the plug 100 includes a sleeve 110. Sleeve 110 is similar to a sleeve which is found on standard SC connectors which includes key 112. The plug 100 includes a body and a cover. The plug 100 is assembled and is operated in a manner similar to the plugs previously discussed.

FIGS. 20–23 disclose yet another embodiment of the invention which is a connector or plug 120 having four ferrules 12 and two flexible latch arms 122, 126. The first flexible latch arm 122 includes a locking projection 124 and the second flexible latch arm 126 includes a locking projection 128.

Figure 21:
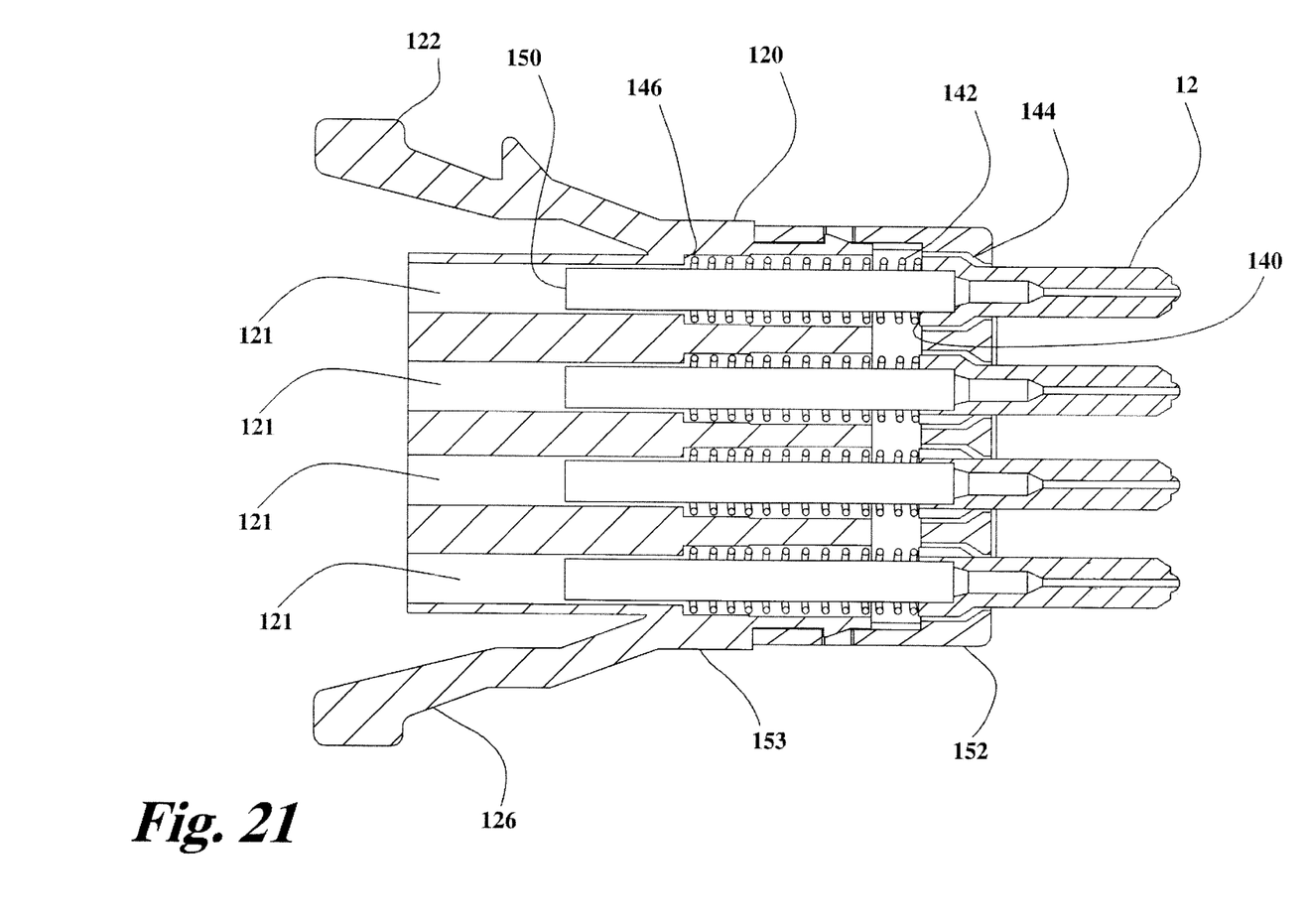
FIG. 21 is a cross-sectional view of the plug of FIG. 20.

FIG. 21 is a cross-sectional view of the plug 120. FIG. 21 shows the ferrules 12 mounted within the plug 120. Each ferrule 12 is attached to a backbone 150 and each ferrule 12 has a collar 140. Each ferrule 12 is associated with a compression spring 142 where the backbone 150 is positioned within the compression spring 142. For reasons of clarity, the backbone 150 is not sectioned, however, the backbone 150 is a hollow cylindrical member. In an unengaged position, the collar 140 contacts a stop surface 144 of the plug 120 due to the force of the compressed compression spring 142 contacting and reacting force through the collar 140 and a projection 146 formed in the plug 120. The fiber optic plug 120 includes a body which is comprised of a cap 152 which snaps onto a bored-out member 153.

The assembly of the plug 120 is similar to the description of the assembly of the device disclosed in U.S. Pat. No. 5,481,634. The spring 142 is placed around the backbone 150 of the ferrule 12. The optical fiber (not shown) is, then, threaded through the aperture 121 of the bored-out member 153 of the plug 120. Next, the optical fiber is inserted into and bonded to the aperture of the ferrule 12. The end of the ferrule 12 is polished. The ferrule 12 is placed in the cap 152 of the plug 120 so as to compress the compression spring 142 between the collar 140 and the projection 146. The compression continues until the cap 152 is snapped onto the bored-out member 153. In this position, the collar 140 abuts the stop surface 144 due to the force applied by the compressed compression spring 142. As compared to the LC ferrules disclosed in U.S. Pat. No. 5,481,634, the collar 140 of the ferrule 12 is smaller in its outer dimensions so as to enable the small separation distance between ferrule apertures of 3.125 mm.

Figure 22:
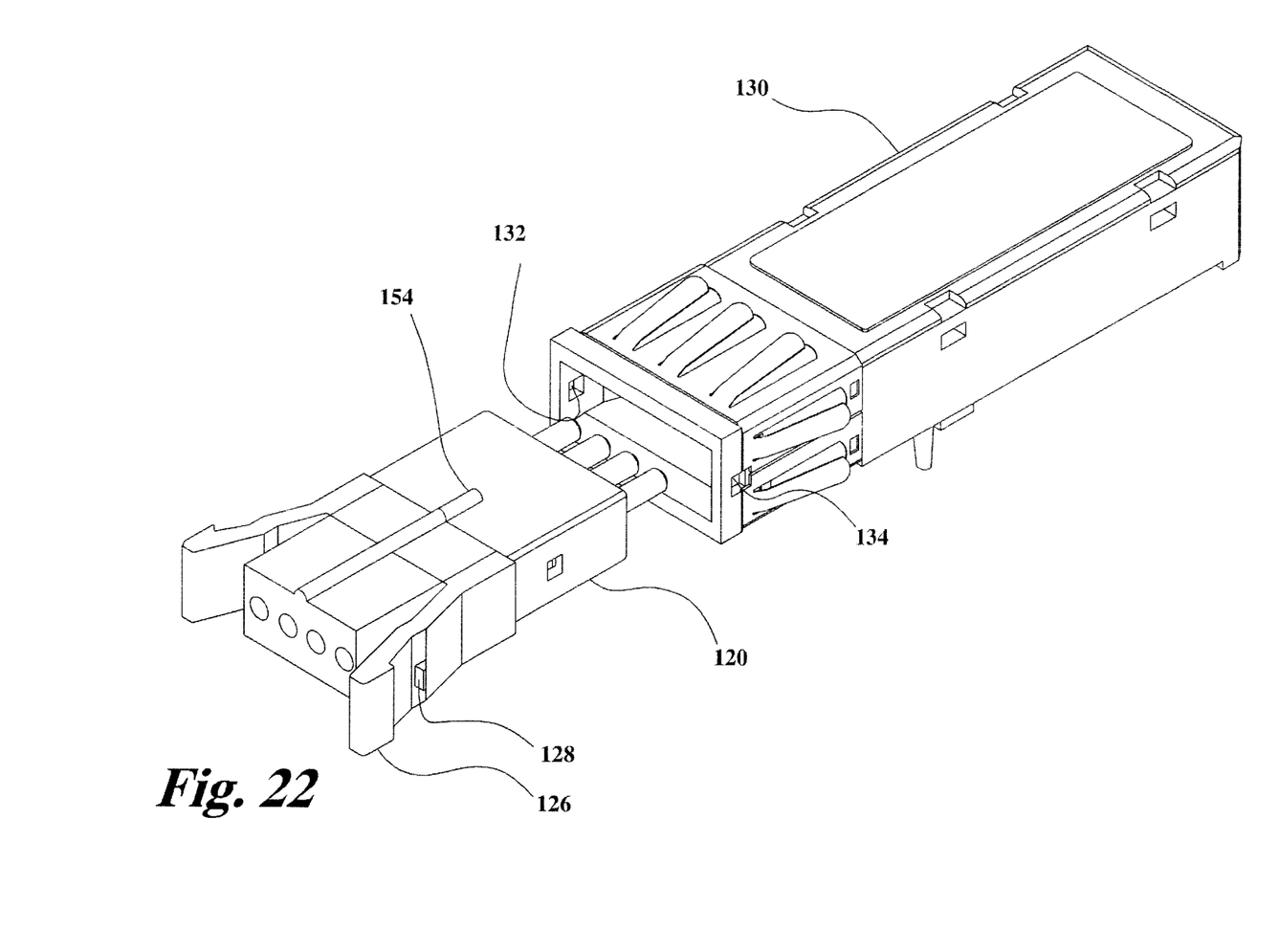
FIG. 22 is a perspective view of the plug of FIG. 20 and a transceiver.

FIG. 22 is a perspective view of the plug 120 and a transceiver 130. The plug 120 mates with the transceiver 130. The transceiver 130 includes a first locking feature 132 which is formed as an aperture, and a second locking feature 134 which is formed as an aperture. The locking projection 124 of the first flexible latch arm 122 of the plug 120 is engageable with the first locking feature 132 of the transceiver 130. The locking projection 128 of the second flexible latch arm 126 of the plug 120 is engageable with the second locking feature 134 of the transceiver 130. Further shown in FIG. 22 is a polarizing member 154 formed on the fiber optic plug 120. The polarizing member 154 of the plug 120 mates with a complimentary feature (not shown) formed in the transceiver 130.

Figure 23:
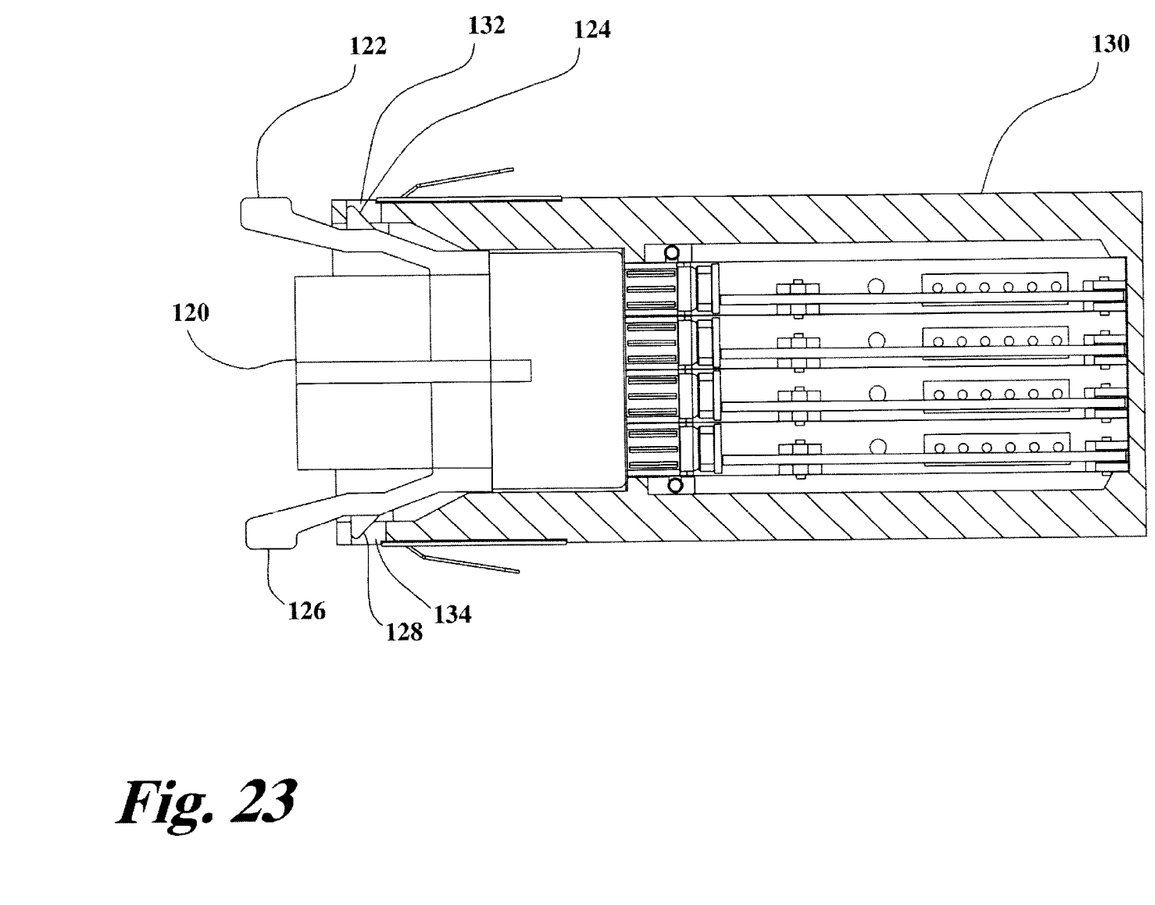
FIG. 23 is a cross-sectional view of the plug of FIG. 22 mated with the transceiver of FIG. 22.

FIG. 23 is a top view of the plug 120 and a partial cross-sectional view of the transceiver 130. Plug 120 is mated with the transceiver 130. As the plug 120 is inserted into the transceiver 130, the flexible latch arms 122, 126 deflect in towards the body of the plug 120. Once the locking projections 124, 128 of the flexible latch arms 122, 126 pass by respective edges of the first and second locking features 132, 134 of the transceiver, the locking projections 124, 128 enter the respective locking features 132, 134. In such a state, the plug 120 is locked to or fully engaged with the transceiver 130. To release the plug 120 from the transceiver 130, the operator can push with his fingers on the terminal ends of the flexible latch arms 122, 126 so as to bring the flexible latch arms 122, 126 closer to each other. Once the locking projections 124, 128 have been removed from the locking features 132, 134, the operator can pull the plug 120 away from the transceiver.

Obviously, numerous modifications and variations of the present invention are possible in light of the above teachings. It is therefore to be understood that within the scope of the appended claims, the invention may be practiced otherwise than as specifically described herein.

What is claimed is:

1. A fiber optic plug comprising:
   a body, the body includes a cavity, the body made of a polymer material;
   a first ferrule attached to the body, the first ferrule having only a first aperture, the first ferrule has a diameter substantially equal to 1.25 mm, the first ferrule includes a first collar;
   a second ferrule attached to the body, the second ferrule having only a second aperture, the second ferrule has a diameter substantially equal to 1.25 mm, the second ferrule includes a second collar;
   a third ferrule attached to the body, the third ferrule having only a third aperture, the third ferrule has a diameter substantially equal to 1.25 mm, the third ferrule includes a third collar;
   a fourth ferrule attached to the body, the fourth ferrule having only a fourth aperture, the fourth ferrule has a diameter substantially equal to 1.25 mm, the fourth ferrule includes a fourth collar;
   a first optical fiber mounted in the first aperture of the first ferrule;
   a second optical fiber mounted in the second aperture of the second ferrule;
   a third optical fiber mounted in the third aperture of the third ferrule;
   a fourth optical fiber mounted in the fourth aperture of the fourth ferrule;
   a first flexible latch arm attached to the body, the first flexible latch arm having a first locking projection;
   a second flexible latch arm attached to the body, the second flexible latch arm having a second locking projection; and
   a shroud attached to the body, the shroud being made of a polymer material, and wherein the shroud substantially encloses the cavity of the body, and wherein
   the first collar of the first ferrule is mounted within the cavity of the body, and wherein
   the second collar of the second ferrule is mounted within the cavity of the body, and wherein
   the third collar of the third ferrule is mounted within the cavity of the body, and wherein
   the fourth collar of the fourth ferrule is mounted within the cavity of the body, and wherein
   the first ferrule is substantially parallel to the second ferrule, and wherein
   the second ferrule is substantially parallel to the third ferrule, and wherein
   the third ferrule is substantially parallel to the fourth ferrule, and wherein
   the first aperture of the first ferrule is separated from the second aperture of the second ferrule by a first distance, and wherein the first distance is substantially equal to 3.125 mm, and wherein
   the second aperture of the second ferrule is separated from the third aperture of the third ferrule by a second distance, and wherein the second distance is substantially equal to 3.125 mm, and wherein
   the third aperture of the third ferrule is separated from the fourth aperture of the fourth ferrule by a third distance, and wherein the third distance is substantially equal to 3.125 mm, and wherein
   the first ferrule, the second ferrule, the third ferrule, and the fourth ferrule exist substantially in a plane, and wherein,
   when the fiber optic plug is inserted into an optoelectronic device, the first locking projection of the first flexible latch arm engages a first complimentary locking feature of the optoelectronic device, and the second locking projection of the second flexible latch arm engages a second complimentary locking feature of the optoelectronic device, and wherein, when the fiber optic plug is removed from the optoelectronic device, an operator pushes on the first flexible latch arm and the second flexible latch arm so as to bring the first flexible latch arm closer to the second flexible latch so that the first locking projection of the first flexible latch arm is removed from the first complimentary locking feature of the optoelectronic device and second locking projection of the second flexible latch arm is removed from the second complimentary locking feature of the optoelectronic device whereupon the operator can pull the fiber optic plug away from the optoelectronic device.

* * * * *